United States Patent [19]

Lundell

[11] 4,027,465
[45] June 7, 1977

[54] ROUND HAY BALER APPARATUS

[76] Inventor: Vernon J. Lundell, P.O. Box 171, Cherokee, Iowa 51012

[22] Filed: July 28, 1975

[21] Appl. No.: 599,336

[52] U.S. Cl. .................................................. 56/341
[51] Int. Cl.² ........................................ A01D 39/00
[58] Field of Search ............... 56/341, 343, 1, 16.4

[56] References Cited

UNITED STATES PATENTS

| | | | |
|---|---|---|---|
| 3,650,100 | 3/1972 | Swan | 56/341 |
| 3,680,296 | 8/1972 | Beebout | 56/341 X |
| 3,815,344 | 6/1974 | Kucera | 56/341 |

*Primary Examiner*—J.N. Eskovitz
*Attorney, Agent, or Firm*—Henderson, Strom & Sturm

[57] ABSTRACT

A hay baler for forming a cylindrical bale having a frame, a rearward disposed rotating drum mounted within the frame with tines secured to the periphery thereof for picking up windrowed hay, a forward disposed carrying roller mounted within the frame for coacting with the drum to carry a bale and a band spring device interconnected between the forward and rearward ends of the frame for forming and compacting a bale.

9 Claims, 6 Drawing Figures

ROUND HAY BALER APPARATUS

BACKGROUND OF THE INVENTION

The baling of hay is one way of storing and preserving hay. Without baling, the hay is at the mercy of the elements to be dispersed, is hard to handle for transportation purposes, and is bulky for storage purposes. By baling hay, these problems have been greatly alleviated.

There are various types of baling machines available, each suited for various purposes. There's the rectangular baler which forms small rectangular bales, the stack type of baler which forms large stack bales, and the round baler which forms large round bales.

The round baler has some very distinct advantages. The first is that the bales may be varied as to size, from a very small bale to one of a very large size. Also, with the round baler, the bales may be so tightly wrapped that they may be near weather resistant which would cut down on the amount of waste. Also, due to the compactness of the bale, when stored outside in various weather conditions, the possibility of the elements scattering the hay is greatly reduced. Another advantage is that the baling process is a one man operation. Also, after the bale is formed, the transportation of the bale to the feed area or storage area is quite easy.

The round balers on the market today are of various constructions, many having a plurality of complex moving parts which increases the cost of the baler initially, they are costly to repair, and due to the complexity of the machines, most farmers can't repair the machine.

Many of these balers offer a bale transportation feature by utilizing a platform on which the bale is formed. By utilizing a platform, the hay must be picked up from the ground and placed upon the platform; thus, leading to the problem of leaving hay in the field. Also, to move the hay from the front of the baler to the rear where the bale is formed involves moving teeth or chain drives which tend to break the shafts of the hay, grind the hay, and thereby clog the machine.

The present invention will alleviate many of the problems faced with today's balers by utilizing a minimum amount of moving parts. Also, transportation of the bale by the baler is a simple process and one achieved by an absence of moving parts and platforms.

SUMMARY OF THE INVENTION

This invention relates to a hay baler, and in particular to a round hay baler having two side walls, a rearward end rotating drum with a plurality of tines secured thereto, a hydraulically operated carrying roller, hydraulically operated lifting arms, band springs, a spring biased band roller, and a conventional baling wire or twine wrapping device.

An object of this invention is to provide a hay baler for forming cylindrical, round, bales, that rolls the bale on the ground, that has a bale carrying device, that utilzes a spring biased band for forming and compacting the bale, that readily ejects the bale and that has a minimum number of moving parts.

Another object of this invention is the provision of a round baler wherein the degree of compaction of the hay in the bale can be varied.

Yet another object of this invention is the provision of a round baler wherein no moving bands or chains are required to form the bale.

Still another object of this invention is the provision of a round baler that utilizes a pickup roller in combination with the pickup drum to provide a carrying device to permit the bale to be transported to a storage place.

Yet another object of this invention is to have a hay baler that is rugged in construction, economical to manufacture, easily repaired, and extremely effective in use.

The objects and other features and advantages become more readily apparent upon reference to the following description when taken in conjunction with the appended drawings.

DESCRIPTION OF THE PREFERRED EMBODIMENT

Figure 1:
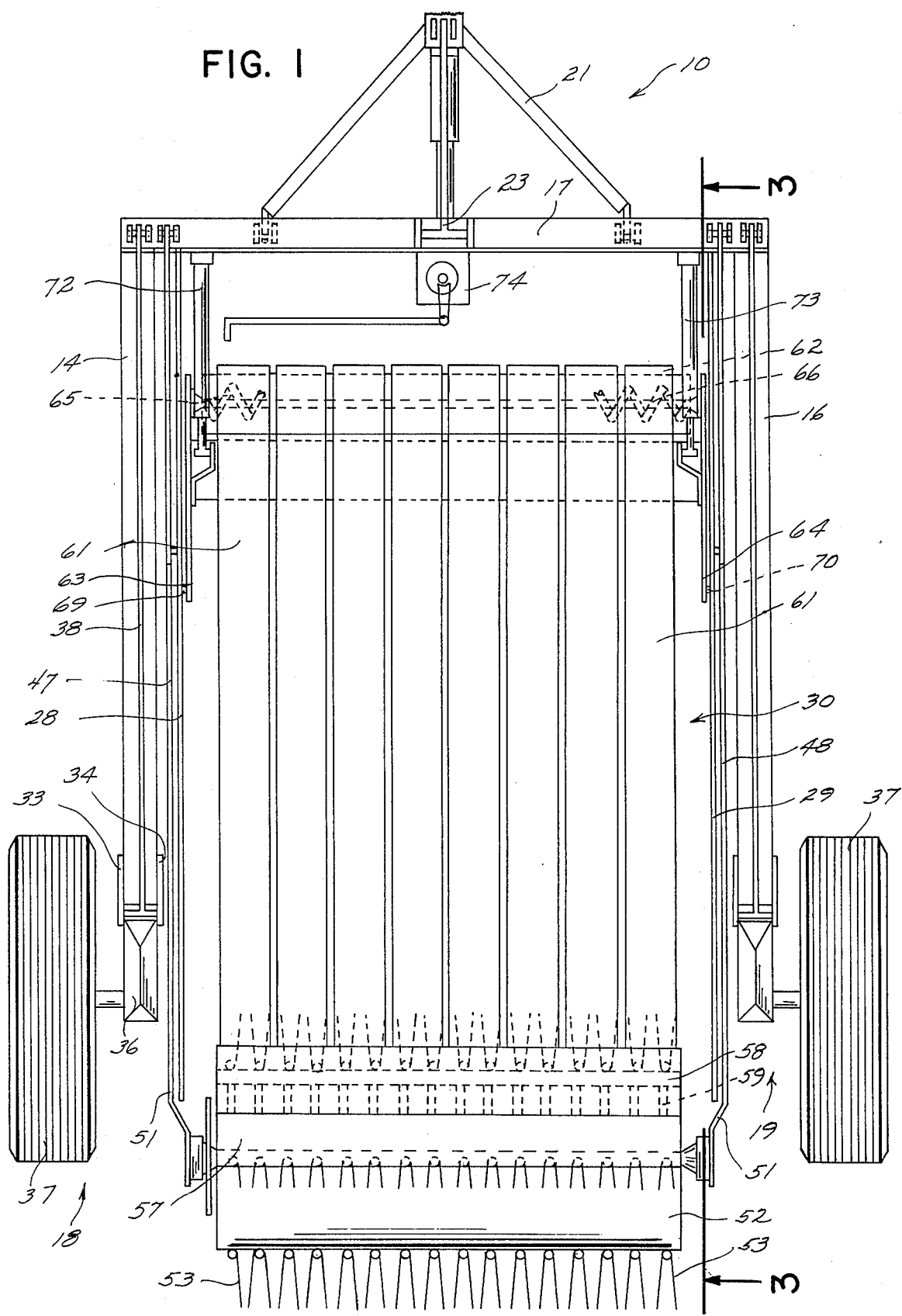
FIG. 1 is a top plan view of the improved round baler apparatus of this invention.
Figure 2:
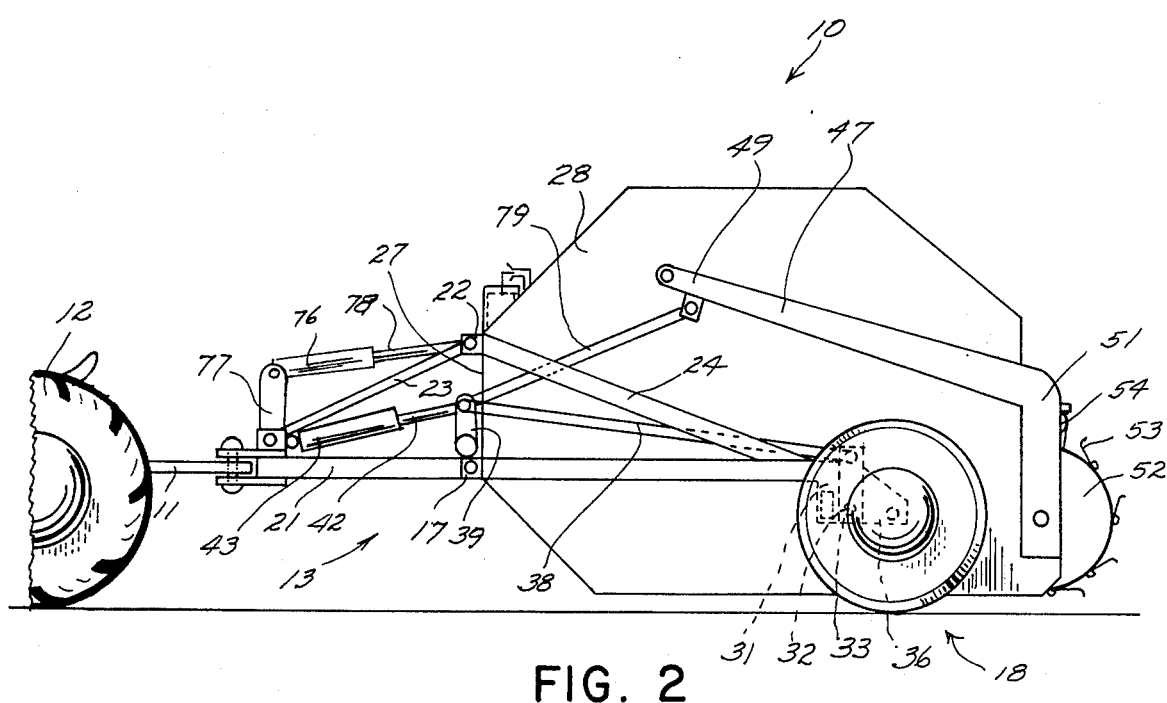
FIG. 2 is a reduced side elevational view thereof.

The hay baler, for forming cylindrical bales, of this invention is depicted generally as 10 in FIGS. 1 and 2 as being attached to the drawbar 11 of a tractor 12. The baler 10 includes a frame 13 having a pair of spaced, horizontally disposed side bars 14 and 16 connected at their forward end to a lower cross beam 17. Pivotally connected to the rear end of each side bar 14 and 16 is a wheel assembly 18 and 19 respectively. Secured to and projecting forwardly of the lower cross beam 17 is a V-shaped, horizontally disposed, tow bar 21. The apex of the tow bar is removably connected to the draw bar 11 of the tractor. Disposed above and parallel to the lower cross beam 17 is an upper cross beam 22, which at its midpoint is connected to the apex of the tow bar 21 by a link 23. Secured to each end of the upper cross beam 22 is one end of a brace number 24 and 26, and the other end of each brace member is secured to the side bar 14 and 16 proximate the wheel assembly 18 and 19. A front wall 27 is connected to the upper and lower cross beam 17 and 22. Substantially parallel side walls 28 and 29 are secured at this forward end to the front wall 27 and their rearward ends extend rearwardly of the wheel assemblies 18 and 19. The front wall 27 and side walls 28 and 29 form an open top and open bottom compartment 30 and the front wall is spaced above the ground for the purpose of providing a passage through which hay disposed in a windrow or the like can pass.

The wheel assembly 18 and 19 (FIGS. 1 and 2) are identical therefore only one will be described with like reference numbers referring to like parts. Referring to FIG. 2, the wheel assembly 18 includes a flange 31 secured to and depending from the side bar 14. Pivotally connected to the flange 31 by a pin 32 are a pair of parallel upright posts 33 and 34, and extending rearwardly of and disposed partially between the posts is a journal plate 36. Rotatably mounted on the plate 36 is a wheel 37 which which supports the frame 13. Pivotally secured to the top of the plate 36 is one end of an arm 38, the other end of which is pivotally connected to a rocker link 39. The rocker link 39 is pivotally connected to the lower cross beam 17. A shaft 41 is connected between the two rocker links 39 and proximate the midpoint thereof is connected the free end of the piston rod 42 of a hydraulic cylinder 43. The hydraulic cylinder 43 is pivotally secured to the apex of the tow bar 21 and fluidly connected to the hydraulic system of the tractor 12. In operation the cylinder is operable to pivot the plates 36 about the posts 33 and 34 to raise the frame 13 relative to the ground.

Pivotally mounted to each sidewall 14 and 16 by pin 44 and 46 is an L-shaped lifting arm 47 and 48 respectively. Each lifting arm 47 or 48 has a long leg 49 integral with a short leg 51 with the free end of the long leg 49 connected to the side wall 14 or 16 and the free end of the short leg 51 depends and projects rearwardly of its respective side wall. Rotatably secured between the short legs' free ends is a drum 52 having a plurality of U-shaped tines 53 secured thereto. A hydraulic orbit motor 54 is operably connected to the drum 52 by a chain 56 wherein operation of the motor will cause the drum to rotate. The motor is secured to a cross member 57 which is secured between the two lifting arms 47 and 48 above the drum.

Figure 3:
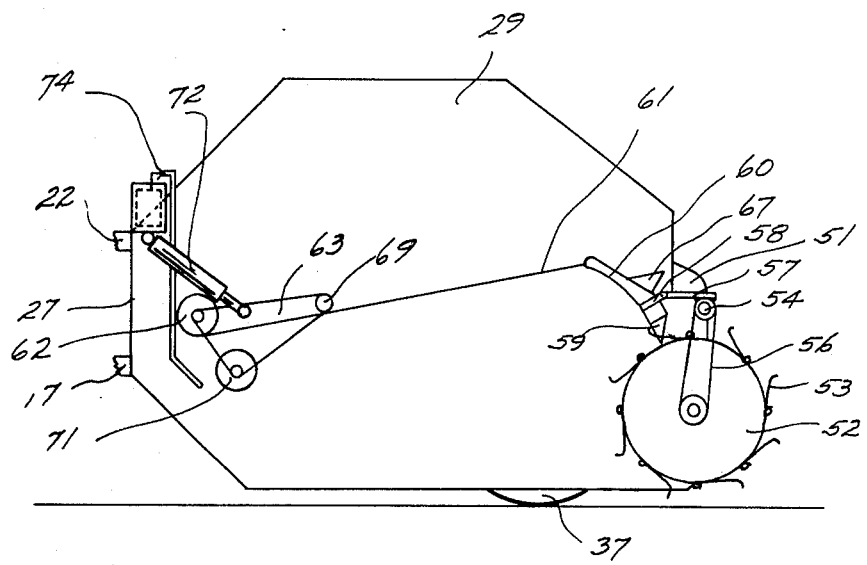
FIG. 3 is a reduced sectional view taken along the lines 3 —3 in FIG. 1.
Figure 4:
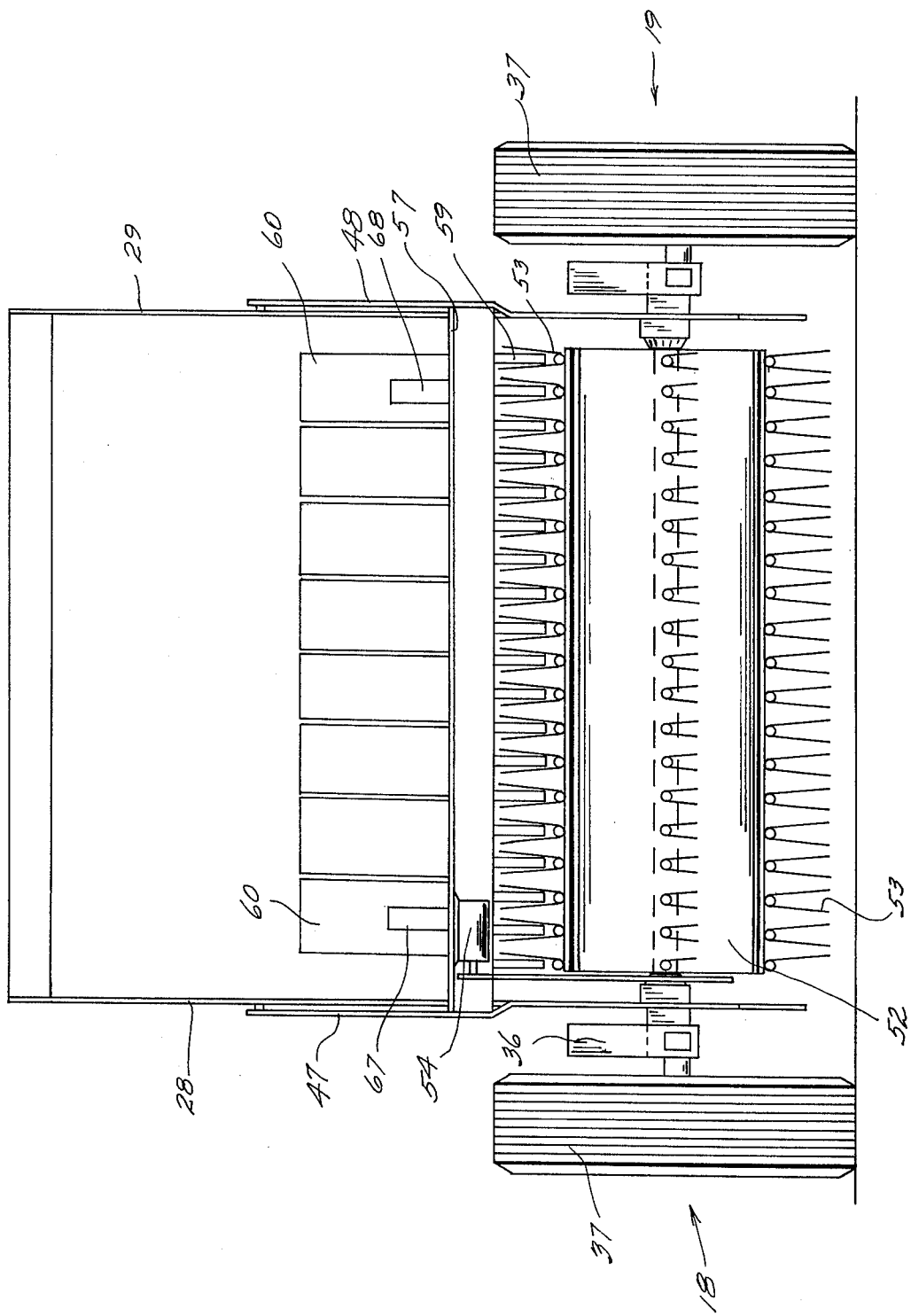
FIG. 4 is an end elevational view thereof.

Pivotally secured to the forward end of the cross member is a cross bar 58. (FIGS. 1, 3 and 4) Depending from the cross bar 58 are a plurality of space cleaner bars 59, which are positioned to permit the legs of the tines 53 to straddle them. Projecting upwardly and forwardly from the cross bar are a plurality of arcuate shaped band holders 60. Secured to the top end of each band holder is one end of a band 61. Spaced forwardly of the holders proximate the front wall 27 is a band roller 62 around which is wrapped a portion of the other end of each of the bands 61. The band roller 62 is transversely disposed between the side walls proximate the forward end thereof and rotatably mounted between a pair of spaced triangular plates 63 and 64 proximate one of the corners thereof. The band roller 62 is spring biased to a first position by a pair of internally mounted springs 65 and 66. Each spring is secured on one end to the plate and on the other end to the roller. When the band roller is in the first position, a portion of each band is wrapped around the roller and the rest of the band extends directly to its respective band holder. Secured to the cross bar and outermost band holders are a pair of spaced stop plates 67 and 68 which project rearwardly thereof to limit the pivoting of the cross bar relative to the cross member. The action of the springs causes the bands to pull against the band holders thus pivoting them forwardly to a first position. (FIG. 3) Each plate 63 and 64 is pivotally secured at a second corner thereof to the side wall by a pin 69 or 70. A pickup roller 71 is secured between the plates 63 and 64 at the third corner. A pair of spaced hydraulic cylinders 72 and 73 are secured on the cylinder end to the upper cross beam 22 and on the piston rod end to the plates 63 and 64 wherein operation of the cylinder 72 and 73 will pivot the plates 63 and 64 to cause the pickup roller to move toward the drum.

Mounted intermediate the side walls to the front wall 27 is a conventional automatic twine device 74 for releasing twine which wraps around the bale while it is being formed.

In operation the baler in a FIG. 2 position is towed behind the tractor across a field having windrowed hay deposited thereon. As the baler passes along the windrow with the orbit motor rotating the drum in a direction opposite the direction in which the baler is moving, the tines pick up the hay and direct it forwardly over the windrowed hay thus forming a cylindrical bale. As the bale increases in diameter it contacts the bands which are under tension, thus compacting the hay between the ground and the bands, and at the same time causing the band roller to rotate against the bias of the springs thus permitting each band to form an arcuate shape as the bale is formed. However, it should be remembered that the tension on the bands forms a compact round bale between the side walls of the baler. Any hay sticking to the tines will be removed as the tines pass over the cleaner bars.

Figure 5:
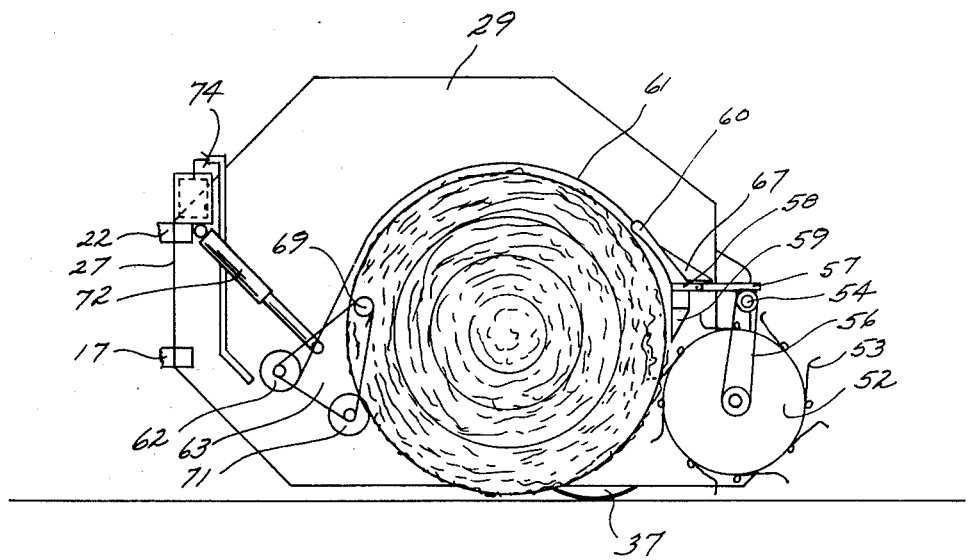
FIG. 5 is a sectional view similar to FIG. 3 with a bale formed and carried therein.

As the bale increases in size, the band holders and cross bar pivot to a second position (FIG. 5) wherein the configuration provided by forward edge of the drum, the forward edge of the cleaner bars and the forward edges of the band holders form a generally arcuate forward surface against which the bale rolls and which helps compact the bale as it is forced thereagainst by the forward motion of the baler.

If it is desired to wrap the bale with twine, the twine device is actuated and twine is let out through the depending arm which oscillates back and forth. The twine contacts the windrowed hay and is wrapped around the bale by the action of the drum.

In many cases it is desired that the round bale be deposited in a predetermined place. To protect the bale and for transportation purposes, the hydraulic cylinders 69 and 71 are operated to move the pickup roller toward the drum (FIG. 5) thus causing the bale to be suspended between the drum and the pickup roller and above the ground.

Release of the bale is accomplished by raising the lifting arms and simultaneously raising the frame by pivoting the wheel plates. An alternate form of discharging the bale utilizes the connection of a hydraulic cylinder 76 to the top end of an upright post 77 projecting upwardly of the apex of the tow bar 21. The free end of the piston 78 projecting rearwardly of the cylinder is secured to the upper cross beam 22 at its midpoint. Operation of the cylinder causes the rear end of the baler to pivot about the lower cross beam 17.

Although the baler is mounted on wheels, the side walls could be provided with skids to permit the baler to slide on the ground without detracting from the true scope and purpose of the invention.

Figure 6:
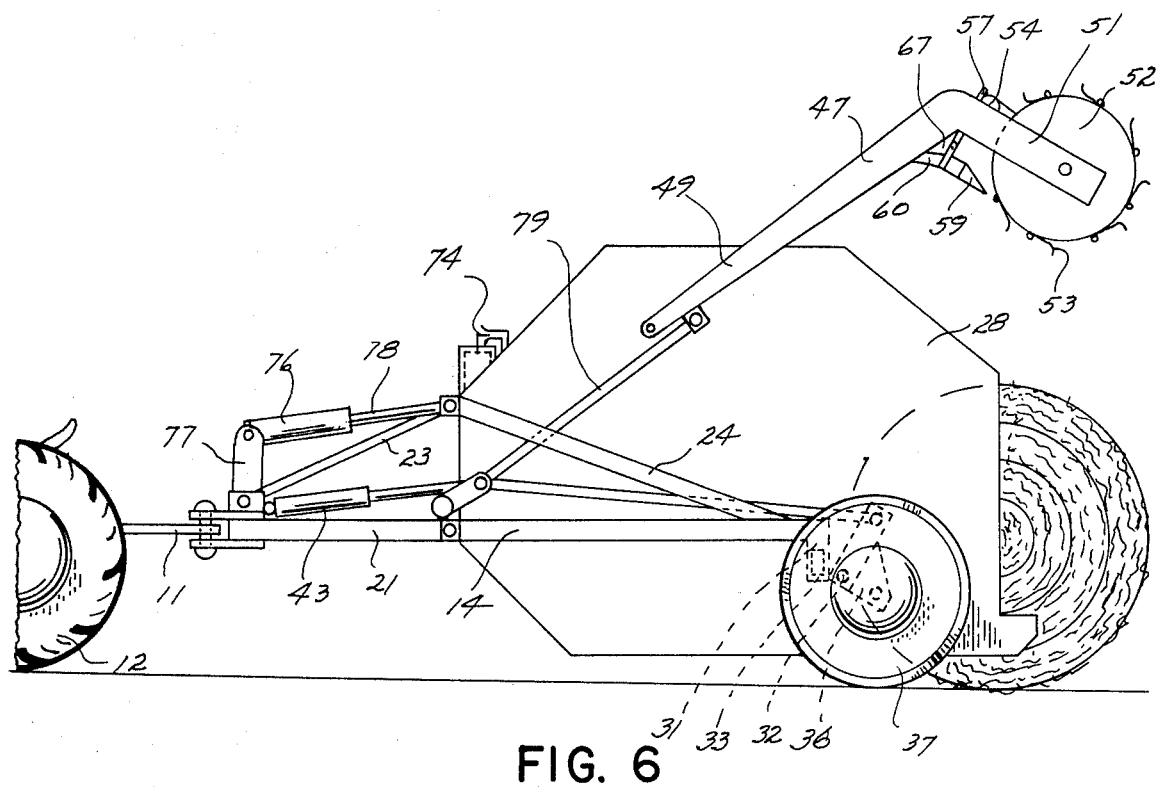
FIG. 6 is a side elevational view similar to FIG. 2 and discharging a bale therefrom.

To pivot the lifting arms 47 and 48 a connecting arm 79 and 81 is secured on one end to the rocker arm 39 and on the other end to the lifting arm 47 or 48. Operation of the cylinder 43 thus causes both the lifting arms to pivot but also the wheel plates pivot (FIG. 6).

In the event it is desired to form bales which are compacted at a tighter bale, or in the alternative not as tight a compaction, the springs 65 and 66 may be tightened or loosened thus placing greater or less tension on the bands.

I claim:

1. A baler for picking up cut hay from a field and forming it into a cylindrical bale, said baler comprising:
   portable frame means having a forward end and a rearward end;
   upright spaced sidewalls mounted to said frame;
   drum means rotatably mounted within said frame means proximate said rear end, said drum means having pickup means mounted thereon for picking up the hay and for rolling the hay into a cylindrical bale and for rolling the bale;

spring biased band means mounted above the ground in said frame means and extending from proximate said drum means to proximate said forward end, said band means provided to compact the hay in the bale as it is formed between the ground and said band means;

power means operably connected to said drum means for rotating said drum means; and said band means includes a cross member extending between said sidewalls above said drum means, a band roller rotatably mounted between said sidewalls proximate said forward end, at least one band having one end secured to said cross member and having the other end wrapped around said roller, spring means interconnected between said sidewalls and said roller to bias said roller in a position wherein said band extends in a first position directly between said roller and said cross member, said band movable from said first position to a second position wherein it forms an arc between said cross member and said roller as it engages the bale being formed thereunder.

2. A baler as defined in claim 1 including a pair of spaced wheel assembly means rotatably secured to said frame means for supporting said frame means; each said wheel assembly means including a flange secured to and depending from said frame means proximate said rearward end, upright post means pivotally secured to said flange, a journal plate secured to said post means and extending rearwardly thereof, a wheel rotatably mounted on said journal plate, an elongated arm having one end pivotally secured to said journal plate and having the other end projecting toward said forward end, a rocker arm pivotally secured to said frame means proximate said forward end and having said other end of said arm pivotally connected thereto, and power means interconnected between said frame means and said rocker arm, said power means operable to pivot said plate about said frame means to raise and lower said frame means relative to said wheels.

3. A baler as defined in claim 1 wherein said frame means comprises a lower cross member secured between said sidewalls proximate the forward end, an upper cross member secured between said sidewalls and parallel to said lower cross member, a tow bar pivotally secured on one end to said lower cross member and having a free end projecting forwardly thereof, said free end being detachably mounted to the drawbar of a prime mover, an upright post secured to said free end, and a hydraulic cylinder interconnecting said upper cross member and said upright post a predetermined distance above said tow bar, wherein operation of said hydraulic cylinder causes the rearward end of frame means to pivot a greater distance above the ground than the forward end of said frame means.

4. A baler as defined in claim 1 wherein said spring means are adjustably interconnected to permit the tension in said bands to be varied thus varying the compaction of hay in a bale.

5. A baler as defined in claim 4 including pickup roller means pivotally secured to said sidewalls and disposed below said band roller, said pickup roller means movable from a first position proximate said forward end to a second position disposed closer to said drum wherein said pickup roller means in said second position and said drum means will carry a bale therebetween and above the ground surface.

6. A baler as defined in claim 5 wherein said pickup roller means includes a pair of spaced triangular plates with each plate pivotally secured to one of said sidewalls, a pickup roller rotatably mounted between said triangular plates, and power means interconnected between said frame means and said triangular plates to pivot said pickup roller from said first position to said second position and from said second position to said first position.

7. A baler as defined in claim 4 wherein said drum means includes a pair of spaced lifting arms, each said lifting arm pivotally secured on one end to one of said sidewalls, a drum rotatably mounted between the other ends of said lifting arms, and power means interconnected between said lifting arms and said frame means for lifting said drum from a first position disposed proximate the ground to a second position wherein a bale can pass thereunder.

8. A baler as defined in claim 7 including a cross member secured between said lifting arms proximate said drum, said cross member having a plurality of cleaner bars secured thereto and projecting therefrom toward said drum for cleaning hay from said pickup means.

9. A baler as defined in claim 8 wherin said power means includes a pair of elongated members, each pivotally secured on one end to one end of said rocker arms and on the other end to one of said lifting arms one end, said members provided to pivot said lifting arms.

* * * * *